Oct. 4, 1927.

O. J. ZOBEL 1,644,004

ELECTRICAL WAVE FILTER

Filed May 4, 1923     6 Sheets-Sheet 1

INVENTOR
O. J. Zobel
ATTORNEY

Oct. 4, 1927.

O. J. ZOBEL

1,644,004

ELECTRICAL WAVE FILTER

Filed May 4, 1923    6 Sheets-Sheet 2

INVENTOR
O. J. Zobel
BY
ATTORNEY

Oct. 4, 1927.  O. J. ZOBEL  1,644,004
ELECTRICAL WAVE FILTER
Filed May 4, 1923    6 Sheets-Sheet 3

INVENTOR
O. J. Zobel
BY
ATTORNEY

Oct. 4, 1927. 1,644,004
O. J. ZOBEL
ELECTRICAL WAVE FILTER
Filed May 4, 1923  6 Sheets-Sheet 4

INVENTOR
O. J. Zobel
BY
ATTORNEY

Oct. 4, 1927.

O. J. ZOBEL

1,644,004

ELECTRICAL WAVE FILTER

Filed May 4, 1923    6 Sheets-Sheet 5

INVENTOR
O. J. Zobel
BY
ATTORNEY

Oct. 4, 1927.  O. J. ZOBEL  1,644,004
ELECTRICAL WAVE FILTER
Filed May 4, 1923   6 Sheets-Sheet 6

INVENTOR
O. J. Zobel
BY
ATTORNEY

Patented Oct. 4, 1927.

1,644,004

UNITED STATES PATENT OFFICE.

OTTO J. ZOBEL, OF NEW YORK, N. Y., ASSIGNOR TO AMERICAN TELEPHONE AND TELEGRAPH COMPANY, A CORPORATION OF NEW YORK.

ELECTRICAL WAVE FILTER.

Application filed May 4, 1923. Serial No. 636,668.

The principal object of my invention is to provide a new and improved network for the diversion of alternating electric currents into different branch circuits in accordance with their frequency. Another object of my invention is to provide a wave-filter of low- and-band pass class. Another object is to provide a wave-filter of this class with means for adjustment or modification so that wave-filters of all other desirable useful classes may be obtained therefrom. Another object is to provide methods of adjustment by which a wave-filter of the class mentioned can be made to serve for a variety of uses. All these and other objects of my invention will be made apparent in connection with the following specification in which I have disclosed a limited number of specific embodiments of the invention. The following specification will relate to these examples with the understanding that the invention is defined in the appended claims.

Referring to the drawings, Fig. 5ª is an attenuation-frequency diagram for the wave-filter defined as in Fig. 4 or Fig. 5. Figs. 10, 13, 16, 19, 22, 25, 27, 30, 34 and 37 are diagrams for the series and shunt impedances of special case wave-filters that may be derived from Fig. 8 by certain particular adjustments of its elements. (Fig. 27 is included in both lists for a reason that will be pointed out presently.) Figs. 11, 14, 17, 20, 23, 26, 28, 31, 32, 35 and 38 are attenuation frequency diagrams for the wave-filters defined in accordance with the respectively associated impedance element diagrams in the drawings.

Figure 1:
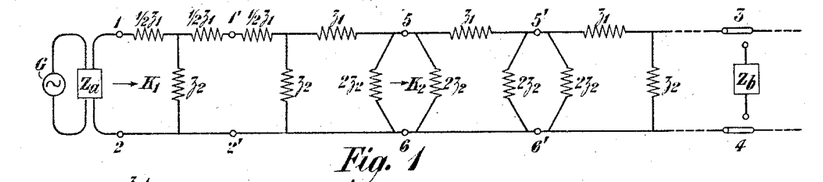
Figure 1 is a general diagram of a "ladder-type" wave-filter.

Referring to the ladder-type wave-filter shown in Fig. 1, this is a recurrent network with successive series impedances $z_1$ and alternately disposed shunt impedances $z_2$. The input terminals of the networks are at 1, 2. In developing the theory of such a network, it is convenient and is a well recognized practice first to assume that it extends infinitely from the terminals 1, 2. The theory obtained on this basis will then be found useful with simple modifications when the switches 3, 4 are thrown so as to terminate the network by an appropriate impedance $Z_b$. It is also assumed that the impedances $z_1$ and $z_2$ are pure reactances. In practice it is generally desirable that they shall have as little dissipation loss as practicable, and it is possible actually to construct the coils and condensers of $z_1$ and $z_2$ so that the wave-filter will approximate closely in its performance to the ideal wave-filter with dissipationless elements. When alternating electromotive forces of a certain frequency from the generator G are applied through the initial impedance $Z_a$, the resulting currents entering the network will, in general, divide to the series and shunt paths of the network. When the impedances $z_1$ and $z_2$ are appropriately designed, the currents entering the network at 1, 2 will be shunted in large part for certain frequencies, in which case the currents are said to be attenuated, but the currents will not be shunted substantially for other frequencies, in which case they are said to be passed.

The wave-filter shown in Fig. 1 has mid-series initial termination at 1, 2; this means that the network begins with half a full series impedance as is indicated on the drawing. The impedance $K_1$ across the points 1, 2 is called the mid-series characteristic impedance, assuming the infinite extension of the network to the right as already explained. Evidently this impedance will be the same across any pair of mid-series points such as $1'$, $2'$. The section between $1$, $2$ and $1'$, $2'$ is called a mid-series section.

The shunt element between the points $5$, $6$ is replaced by two impedances each of value $2z_2$; it will be evident that the impedance value of these two impedances in parallel is $z_2$. The impedance to the right across the points $5$, $6$, represented by $K_2$, is called the mid-shunt characteristic impedance, and the section between $5$, $6$ and $5'$, $6'$ is called a mid-shunt section.

The propagation constant of the network of Fig. 1 represented by the character $\Gamma$, is defined to be such a number that $e^{-\Gamma}$ equals the ratio of the current in any series element $z_1$ to the current in the next preceding element $z_1$ nearer to the input terminals $1$, $2$. $\Gamma$ is, in general, a complex number; let its components be given by the equation $\Gamma = A + iB$ where $A$ is the attenuation constant and $B$ the phase constant. (1)

The following formulæ may be readily proved for Fig. 1.

$$\cosh \Gamma = 1 + \frac{1}{2}\frac{z_1}{z_2}, \quad (2)$$

$$K_1 = \sqrt{z_1 z_2 + \frac{1}{4}z_1^2}, \quad (3)$$

$$K_2 = \frac{z_1 z_2}{\sqrt{z_1 z_2 + \frac{1}{4}z_1^2}} = \frac{z_1 z_2}{K_1}. \quad (4)$$

Figure 2:
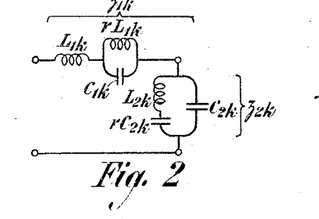
Fig. 2 is a diagram showing certain particular embodiments for the impedances $z_1$ and $z_2$ of Fig. 1.

The foregoing formulæ are valid for a ladder-type wave-filter in which the impedances $z_1$ and $z_2$ take any form whatever. For the purpose of the present specification, let $z_1$ take the form designated $z_{1k}$ in Fig. 2, and let $z_2$ take the form designated $z_{2k}$ in Fig. 2. The respective inductances and capacities of Fig. 2 are assumed to have the values indicated by the letters associated with them, where $r$ is a positive real number. Moreover, let there be a reciprocal relationship between the elements of $z_{1k}$ and $z_{2k}$ as is given by the following equations:

$$\frac{L_{2k}}{C_{1k}} = \frac{L_{1k}}{C_{2k}} = R^2, \quad (5)$$

where $R$ is a positive real number.

A wave-filter constructed in accordance with Fig. 2, will be an example of a "constant $k$" wave-filter. A "constant $k$" wave-filter is defined to be one for which $z_1 z_2 = k^2$ where $k$, the characteristic impedance of the corresponding smooth line, is a constant. It can readily be shown that $$z_{1k} z_{2k} = R^2, \quad (6)$$

thus establishing that $k = R$ for Fig. 2, and that a wave-filter made according to the plan of Fig. 2 will be a "constant $k$" wave-filter.

Figure 3:
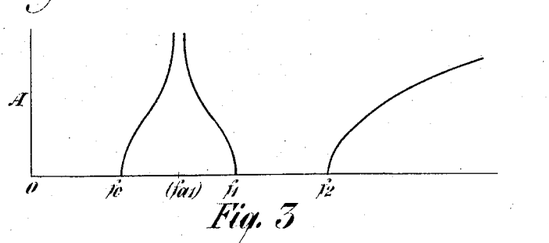
Fig. 3 is an attenuation-frequency diagram for the wave-filter defined as in Fig. 2.

By means of (1c), the attenuation-frequency characteristic of the wave-filter of Fig. 1 may be obtained, when the values of $z_1$ and $z_2$ are known. For the values given in Fig. 2, this characteristic is given in Fig. 3. It will be seen that from zero frequency up to $f_0$ the currents applied at $1$, $2$ in Fig. 1 are transmitted without attenuation. For frequencies from $f_0$ on up to $f_1$ the currents are attenuated and at one particular frequency, $f_{a1}$, within this attenuation band, the attenuation becomes infinite. Again, from frequency $f_1$ on up to $f_2$ the currents are transmitted without attenuation, and from $f_2$ up to infinity they are again attenuated with infinite attenuation at the upper extreme, that is at infinite frequency.

The critical frequencies $f_0$, $f_1$ and $f_2$ are the frequencies at which $z_{1k}$ takes the respective values $+i2R$, $-i2R$ and $+i2R$. The general value of $z_{1k}$ is given by the following equation:

$$z_{1k} = i2\pi f L_{1k}\left(1 + \frac{r}{1 - 4\pi^2 f^2 r L_{1k} C_{1k}}\right). \quad (7)$$

By assigning to $z_{1K}$ each of the three values given above corresponding to the three critical values of $f$, we have three equations which we may solve with respect to $f_0$, $f_1$ and $f_2$ as parameters. In this way we can design the wave-filter so as to put the critical frequencies $f_0$, $f_1$ and $f_2$ at any points we please along the frequency scale. The resulting equations of design in terms of $f_0$, $f_1$ and $f_2$, are as follows:

$$L_{1k} = \frac{R}{\pi(f_0 - f_1 + f_2)}, \quad (8)$$

$$C_{1k} = \frac{(f_0 - f_1 + f_2)^2}{4\pi[(f_0 f_1 - f_0 f_2 + f_1 f_2)(f_0 - f_1 + f_2) - f_0 f_1 f_2]R}, \quad (9)$$

$$r = (f_0 - f_1 + f_2)\left(\frac{1}{f_0} - \frac{1}{f_1} + \frac{1}{f_2}\right) - 1 \quad (10)$$

The frequency of infinite attenuation, $f_{a1}$, is determined by the assignment of values to the critical frequencies $f_0$, $f_1$ and $f_2$.

Figure 4:
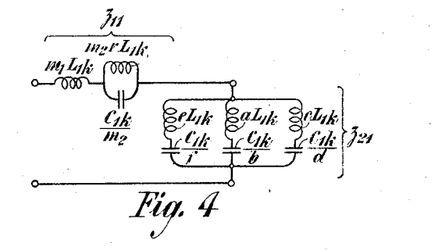
Figs. 4 and 5 are diagrams each showing a set of certain generalized values for the impedances $z_1$ and $z_2$ of Fig. 1 as compared with the values in Fig. 2.

Attention is directed to Fig. 4 which shows another set of values for the impedances $z_1$ and $z_2$. It is now proposed to replace $z_1$ of Fig. 1 by $z_{11}$ of Fig. 4 and $z_2$ of Fig. 1 by $z_{21}$ of Fig. 4. $L_{1k}$, $C_{1k}$ and $r$ have the same values as in Fig. 2; $m_1$ and $m_2$ are two arbitrary parameters; and the values of $a$, $b$, $c$, $d$, $e$ and $f$ are reached as follows:

Impose the condition that the mid-series characteristic impedance is the same for Figs. 2 and 4, that is, $$K_{1k} = K_{11} \quad (11)$$

From (3), (6) and (11), it follows that:

$$z_{21} = \frac{R^2 + \frac{1}{4}(z^2{}_{1k} - z^2{}_{11})}{z_{11}}. \quad (12)$$

But, of course, $z_{21}$ can be expressed in terms of the values of the elements of $z_{21}$ as they are written in on Fig. 4; for brevity, let the result be expressed as $$z_{21} = F(a, b, c, d, e, f, L_{1k}, C_{1k}); \quad (13)$$

in each of (12) and (13) the impedance $z_{21}$ can be expressed as a function of the reactances $i2\pi f L_{1k}$ and $$\frac{1}{i2\pi f C_{1k}}.$$

Since these expressions of (12) and (13) must be equal at all frequencies, we may equate the coefficients of like powers and products of these reactances, and thus we shall get six equations, determining $a$, $b$, $c$, $d$, $e$ and $f$ in terms of $m_1$, $m_2$, $f_0$, $f_1$ and $f_2$.

But in ordinary practical design we are not prepared to assign values to $m_1$ and $m_2$ at the outset. We have seen that for Fig. 2 we can assign the three critical frequencies $f_0$, $f_1$ and $f_2$ at the outset and thereupon the design of the "constant $k$" wave-filter becomes determined by (8), (9) and (10). The wave-filter of Fig. 4 is not a "constant $k$" filter. Compared with the wave-filter of Fig. 2, it has two additional arbitrary parameters $m_1$ and $m_2$. Its attenuation-frequency characteristic is given in Fig. 5ª, from which it will be seen that the abruptness of the cut-off at a critical frequency may be increased if we can bring the frequency of infinite attenuation close to the cut-off frequency. This suggests that it will be advantageous in connection with Fig. 4 to assign two frequencies of infinite attenuation, one in each attenuating band. The three frequencies of infinite attenuation $f'_{1\infty} f_{1\infty}$ and $f_{2\infty}$ in Fig. 5ª are respectively the resonant frequencies of the simple shunt branch in Fig. 4, with which are associated the coefficients $e$ and $\frac{1}{f}$, $a$ and $\frac{1}{b}$, $c$ and $\frac{1}{d}$. By assigning the resonant frequency of such a branch it is easily shown that the product of the coefficient is made definite, and in this way the equations are obtained.

$$\frac{a}{b} = \frac{f_0 f_1 f_2}{(f_0 - f_1 + f_2) f^2{}_{1\infty}} \gamma, \quad (14)$$

$$\frac{c}{d} = \frac{f_0 f_1 f_2}{(f_0 - f_1 + f_2) f^2{}_{2\infty}} \gamma. \quad (15)$$

Hence in addition to the critical frequencies $f_0$, $f_1$ and $f_2$, we assign as definite values at the outset the two frequencies of infinite attenuation $f_{1\infty}$ and $f_{2\infty}$. These five parameters determine the design of the filter of Fig. 4. Its equations of design are (8), (9), (10), (5) and the following eight equations (16) to (23), in which $g$ and $h$ are certain functions of the variable $f$'s as given by equations (24) and (25):

$$m_1 = \frac{\frac{f_1 f_2}{f^2{}_{2\infty}} g + h}{1 - \frac{f^2{}_{1\infty}}{f^2{}_{2\infty}}} \quad (16)$$

$$m_2 = \frac{\left(\frac{f_0 - f_1 + f_2}{f_{2\infty}} - \frac{f_0 f_1 f_2}{f^3{}_{2\infty}}\right) g + \left(\frac{(f_0 - f_1 + f_2) f^2{}_{1\infty}}{f_1 f_2 f_{2\infty}} - \frac{f_0}{f_{2\infty}}\right) h}{\left[\left(1 - \frac{f_0}{f_1} + \frac{f_0}{f_2}\right)\left(\frac{f_0 - f_1 + f_2}{f_{2\infty}}\right) - \frac{f_0}{f_{2\infty}}\right]\left[1 - \frac{f^2{}_{1\infty}}{f^2{}_{2\infty}}\right]} \quad (17)$$

$$a = \frac{f_0 f_1 f_2 r}{(f_0 - f_1 + f_2) f^2{}_{1\infty}} b, \quad (18)$$

$$b = \frac{(f_0 - f_1 + f_2)^2 [(1 - m_1{}^2) f^4{}_{1\infty} f^2{}_{2\infty} - f_0{}^2 f_1{}^2 f_2{}^2]}{4 g r f_0 f_1{}^2 f_2{}^2 [(f_0 - f_1 + f_2) f^2{}_{1\infty} - f_0 f_1 f_2]} \left(1 - \frac{f^2{}_{1\infty}}{f^2{}_{2\infty}}\right) \quad (19)$$

$$c = \frac{f_0 f_1 f_2 r}{(f_0 - f_1 + f_2) f^2{}_{2\infty}} d, \quad (20)$$

$$d = \frac{(f_0 - f_1 + f_2)^2 [(1 - m_1{}^2) f^2{}_{1\infty} f^4{}_{2\infty} - f_0{}^2 f_1{}^2 f_2{}^2]}{4 h r f_0 f_1 f_2 f^2{}_{1\infty} [(f_0 - f_1 + f_2) f^2{}_{2\infty} - f_0 f_1 f_2]} \left(1 - \frac{f^2{}_{1\infty}}{f^2{}_{2\infty}}\right) \quad (21)$$

$$e = \frac{(1 - m_1{}^2) f^2{}_{1\infty} f^2{}_{2\infty} r}{(f_0 - f_1 + f_2) f_0 f_1 f_2} f, \quad (22)$$

$$f = \frac{(f_0 - f_1 + f_2)^2 [(1 - m_1{}^2) f^4{}_{1\infty} f^2{}_{2\infty} - f_0{}^2 f_1{}^2 f_2{}^2]}{4 r f^2{}_{1\infty} f^2{}_{2\infty} [(1 - m_1{}^2)(m_1 - h) f^2{}_{1\infty} f^4{}_{2\infty} - m_1 f_0{}^2 f_1{}^2 f_2{}^2]}$$

$$\cdot \frac{[(1 - m_1{}^2) f^2{}_{1\infty} f^4{}_{2\infty} - f_0{}^2 f_1{}^2 f_2{}^2]}{[(1 - m_1{}^2) f^2{}_{1\infty} f^2{}_{2\infty} - (f_0 - f_1 + f_2) f_0 f_1 f_2]} \quad (23)$$

where $$g = \sqrt{\left(1-\frac{f_0^2}{f_{1\infty}^2}\right)\left(1-\frac{f_{1\infty}^2}{f_1^2}\right)\left(1-\frac{f_{1\infty}^2}{f_2^2}\right)}, \quad (24)$$

and $$h = \sqrt{\left(1-\frac{f_0^2}{f_{2\infty}^2}\right)\left(1-\frac{f_1^2}{f_{2\infty}^2}\right)\left(1-\frac{f_2^2}{f_{2\infty}^2}\right)}, \quad (25)$$

In obtaining the foregoing equations it will also be found incidentally that the remaining dependent frequency of infinite attenuation is determined as follows:

$$f'_{1\infty} = \frac{f_0 f_1 f_2}{\sqrt{1 - m_1^2 f_{1\infty} f_{2\infty}}}. \quad (26)$$

Fig. 4 in its relation to Fig. 2 is an example of a "mid-series equivalent wave-filter". Having given a prototype "constant $k$" wave-filter such as that of Fig. 2, its mid-series equivalent may be obtained by assigning as many $m$'s as the number of attenuating bands, that is the number of simple anti-resonant components in series in $z_1$, preserving the anti-resonant frequencies unchanged in the manner illustrated by the example of Figs. 2 and 4. The element $z_2$ in the equivalent filter will have a plurality of parallel simple resonant paths, their number being the same as the number of reactance elements in $z_1$. All mid-series equivalent wave-filters including their prototype (for which $m_1 = m_2 = \ldots = 1$) have the same mid-series characteristic impedance at all frequencies, and the same critical frequencies, but not the same attenuation characteristics. The presence of the extra parameters, the $m$'s, enables us to adapt the design to give a desired attenuation-frequency characteristic.

Figure 5:
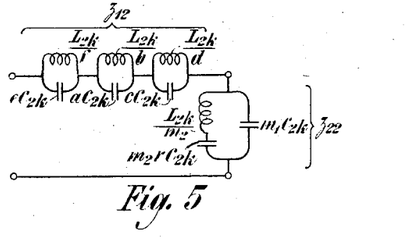
Figure 5A:
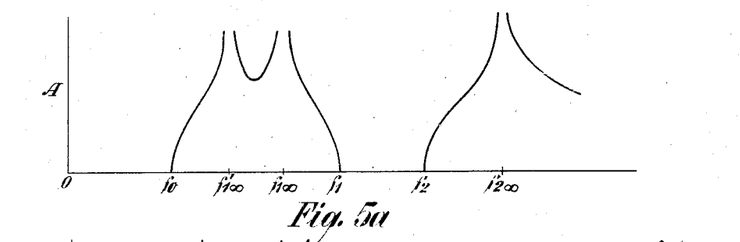

Attention is directed to Fig. 5, which shows another set of special values for $z_1$ and $z_2$ of Fig. 1. Whereas the design of Fig. 4 was made definite by imposing certain conditions, among which was the condition that its mid-series characteristic impedance should be the same as for Fig. 2, on the other hand the design of Fig. 5 is made definite by assuming that its mid-shunt characteristic impedance is equal to the mid-shunt characteristic impedance of the wave-filter of Fig. 2, and its propagation constant the same as that of Fig. 4. In view of the exposition that has been given for Fig. 4, it will not be necessary to give the corresponding demonstration for Fig. 5. The result is that with the system of lettering employed in Fig. 5 the same design equations serve as for Fig. 4, viz, (8), (9), (10), (5) and (16) to (23).

Moreover, mid-series equivalent sections or mid-shunt equivalent sections or both can be combined in one and the same wave-filter, for the impedance characteristic will not be affected and the critical or cut-off frequencies will be the same. Different sections may have different frequencies of infinite attenuation and thus the design may be made to give a favorable attenuation characteristic over a wide frequency range.

Figure 6:
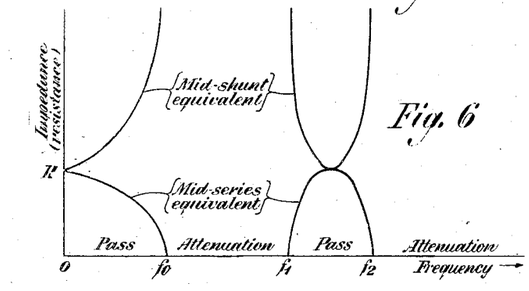
Fig. 6 is an impedance frequency diagram for a ladder-type wave-filter made up as in Figs. 4 and 5 respectively.

In Fig. 6 the mid-series characteristic impedance and the mid-shunt characteristic impedance of the respective wave-filters of Figs. 4 and 5 are shown as functions of frequency. These are plotted by the aid of (3) and (4). From (2) it follows that in the pass bands the impedance is a pure resistance and in the attenuating bands it is a pure reactance. In Fig. 6 only the resistance values (for the pass bands) are shown.

When a wave-filter is connected with a smooth line, it may be desirable that its impedance shall be as nearly as practicable the same as that of the smooth line, especially over the pass bands. It will be seen from Fig. 6 that in each pass band the impedance touches the resistance value R as a maximum or minimum according as the wave-filter is of the structure of Fig. 4 or Fig. 5. By the proper design of the terminal impedances $Z_a$ and $Z_b$, the resistance can be approximated to R much more closely than in Fig. 6, and the value assigned to R at the outset may be the characteristic impedance (resistance) of the smooth line.

Figure 7:
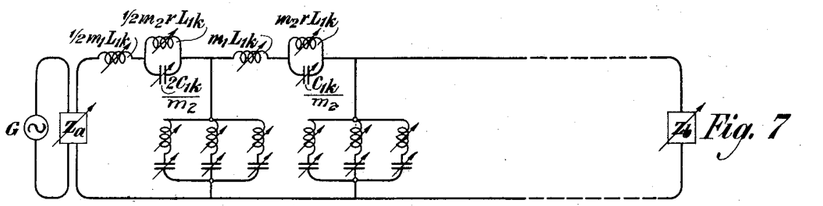
Figs. 7 and 8 are diagrams of adjustable wave-filters built up on the plan of Figs. 4 and 5 respectively.
Figure 8:
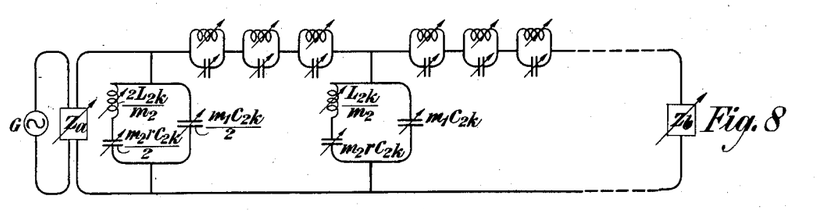

In Fig. 7 I have shown a wave-filter with the filter elements of Fig. 4 and with facility for adjustment of its impedance elements, and similarly in Fig. 8 a wave-filter with the elements of Fig. 5 is shown with facility for adjustment.

Accordingly, with either of the wave-filters of Figs. 7 and 8 we can assign any values we please to the five parameters in order of magnitude $f_0$, $f_{1\infty}$, $f_1$, $f_2$ and $f_{2\infty}$. Then with the aid of (8), (9), (10), (5) and (16) to (25) we can get values for all the inductances and capacities in each wave-filter of Figs. 7 and 8 and adjust those inductances and capacities accordingly. Thereupon we shall have a wave-filter that will give the pass bands and attenuation bands defined by $f_0$, $f_1$ and $f_2$ and that shall have the sharpness of cut-off determined by the location along the frequency scale of $f_{1\infty}$ and $f_{2\infty}$.

By giving certain special values to the $f$'s at the outset or by making certain of these values coincide, and by making adjustments of the capacities and inductances in accordance with the design equations based on such special values of the $f$'s, a wide variety of comparatively simple special wave-filters may be obtained. Some of these will now be pointed out in brief outline.

1. *Low pass wave-filters.*—Let $$f_0 = f_{1\infty} = f_1 = 0 \quad (27)$$

Figure 9:
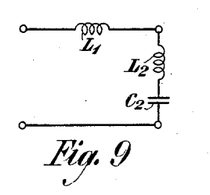
Figs. 9, 12, 15, 18, 21, 24, 27, 29, 33 and 36 are diagrams for the series and shunt impedances of special case wave-filters that may be derived from Fig. 7 by certain particular adjustments of its elements.
Figure 10:
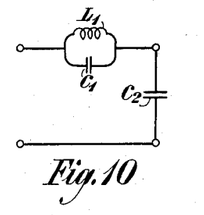
Figures 11, 14:
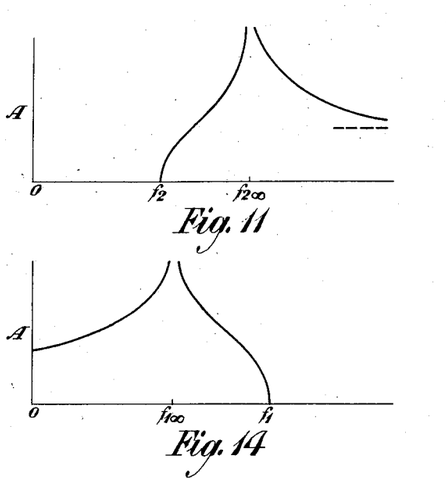

The corresponding simplified forms taken by $z_1$ and $z_2$ are exhibited in Figs. 9 and 10, and in Fig. 11 the attenuation characteristic is shown. If, in addition $f_{2\infty}=\infty$, the wave-filter becomes of "constant $k$" type.

The formulæ for Fig. 9 are $$L_1=mL_{1k}, \quad L_2=cL_{1k}, \quad C_2=mC_{2k},$$

and for Fig. 10

$$L_1=mL_{1k}, \quad C_1=cC_{2k}, \quad C_2=mC_{2k},$$

where $$L_{1k}=\frac{R}{\pi f_2}, \quad C_{2k}=\frac{1}{\pi f_2 R},$$

$$m\equiv[m_1]=\sqrt{1-\frac{f_2^2}{f^2_{2\infty}}}, \quad c=\frac{1-m^2}{4m}.$$

The horizontal dotted line in Fig. 11 indicates that as the frequency increases without limit the corresponding attenuation approaches a finite value which is the ordinate of the dotted line; in other words the curve is asymptotic to the line $A=A_\infty$ where $A\infty$ is a finite value taken by $A$ when $f=\infty$.

The significance of the dotted line is the same in Figs. 20, 23, 31, 32 and 35.

*2. High pass wave-filters.*—Let $$f_0=0 \text{ and } f_2=f_{2\infty}=\infty. \quad (28)$$

Figure 12:
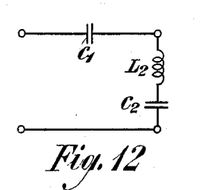
Figure 13:
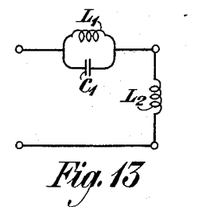

The corresponding physical structures are shown in Figs. 12 and 13 and the corresponding attenuation-frequency characteristic in Fig. 14. If, in addition, we make $f_{1\infty}=0$, the wave-filter becomes of "constant $k$" type.

The formulæ for Fig. 12 are $$C_1=\frac{C_{1k}}{m}, \quad L_2=\frac{L_{2k}}{m}, \quad C_2=\frac{C_{1k}}{b},$$

and for Fig. 13

$$L_1=\frac{L_{2k}}{b}, \quad C_1=\frac{C_{1k}}{m}, \quad L_2=\frac{L_{2k}}{m},$$

where $$C_{1k}=\frac{1}{4\pi f_1 R}, \quad L_{2k}=\frac{R}{4\pi f_1},$$

$$m\equiv[m_2]=\sqrt{1-\frac{f^2_{1\infty}}{f_1^2}}, \quad b=\frac{1-m^2}{4m}.$$

*3. Low-and-high pass (or band stop) wave-filters.*—Let $$f_2=f_{2\infty}=\infty, \quad (29)$$

Figure 15:
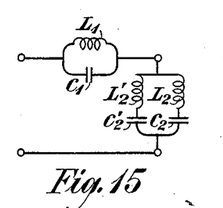
Figure 16:
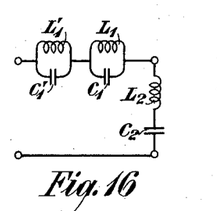
Figure 17:
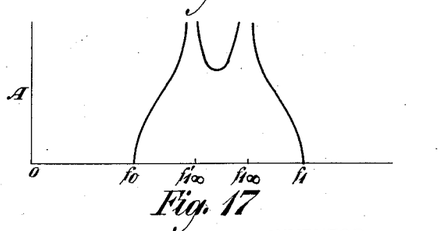

The corresponding structures are shown in Figs. 15 and 16 and the attenuation-frequency characteristic in Fig. 17. If, in addition, we make $$f_{1\infty}=\sqrt{f_0 f_1}$$

it follows that $f'_{1\infty}=f_{1\infty}$, and the wave-filter becomes of "constant $k$" type.

The formulæ for Fig. 15 are $$L_1=mL'_{1k}, \quad L_2=a'L_{2k}, \quad C_1=\frac{C_{1k}}{m},$$

$$C_2=\frac{C'_{2k}}{b'}, \quad L'_2=e'L_{2k}, \quad C'_2=\frac{C'_{2k}}{f'}.$$

and for Fig. 16

$$L_1=\frac{L'_{1k}}{b'}, \quad L_2=\frac{L_{2k}}{m}, \quad C_1=a'C_{1k},$$

$$C_2=mC'_{2k}, \quad L'_1=\frac{L'_{1k}}{f'}, \quad C'_1=e'C_{1k}.$$

where $$L'_{1k}\equiv[rL_{1k}]=\frac{(f_1-f_0)R}{\pi f_0 f_1}, \quad L_{2k}=\frac{R}{4\pi(f_1-f_0)},$$

$$C_{1k}=\frac{1}{4\pi(f_1-f_0)R}, \quad C'_{2k}\equiv[rC_{2k}]=\frac{f_1-f_0}{\pi f_0 f_1 R},$$

$$m\equiv[m_2]=\frac{\sqrt{\left(1-\frac{f_0^2}{f^2_{1\infty}}\right)\left(1-\frac{f^2_{1\infty}}{f_1^2}\right)}}{1-\frac{f_0}{f_1}},$$

$$a'\equiv\left[\frac{4a(f_1-f_0)^2}{rf_0 f_1}\right]=\frac{1}{m}\left(1+\frac{f_0 f_1}{f^2_{1\infty}}\right)=\left[\frac{4f(f_1-f_0)^2}{f_0 f_1}\right]\equiv f',$$

$$b'\equiv\left[\frac{4b(f_1-f_0)^2}{f_0 f_1}\right]=\frac{1}{m}\left(1+\frac{f^2_{1\infty}}{f_0 f_1}\right)=\left[\frac{4e(f_1-f_0)^2}{rf_0 f_1}\right]\equiv e',$$

$$f'_{1\infty}=\frac{f_0 f_1}{f_{1\infty}}.$$

*4. Band pass wave-filters.*—Let $$f_0=0. \quad (30)$$

Figure 18:
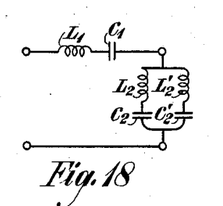
Figure 19:
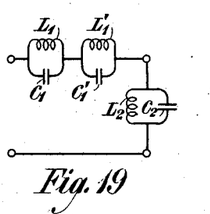
Figure 20:
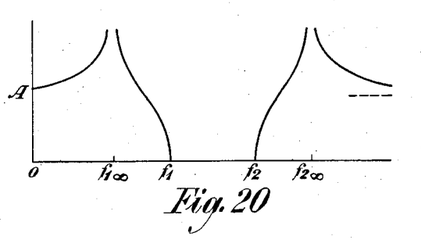

The corresponding structures are shown in Figs. 18 and 19 and the attenuation-frequency characteristic in Fig. 20.

The formulæ for Fig. 18 are $$L_1=m_1 L_{1k}, \quad L_2=aL_{1k}, \quad C_1=\frac{C_{1k}}{m_2},$$

$$C_2=\frac{C_{1k}}{b}, \quad L'_2=cL_{1k}, \quad C'_2=\frac{C_{1k}}{d}.$$

and for Fig. 19

$$L_1=\frac{L_{2k}}{b}, \quad L_2=\frac{L_{2k}}{m_2}, \quad C_1=aC_{2k},$$

$$C_2=m_1 C_{2k}, \quad L'_1=\frac{L_{2k}}{d}, \quad C'_1=cC_{2k}.$$

where $$L_{1k}=\frac{R}{\pi(f_2-f_1)}, \quad L_{2k}=\frac{(f_2-f_1)R}{4\pi f_1 f_2},$$

$$C_{1k}=\frac{f_2-f_1}{4\pi f_1 f_2 R}, \quad C_{2k}=\frac{1}{\pi(f_2-f_1)R},$$

$$g=\sqrt{\left(1-\frac{f^2_{1\infty}}{f_1^2}\right)\left(1-\frac{f^2_{1\infty}}{f_2^2}\right)}, \quad h=\sqrt{\left(1-\frac{f_1^2}{f^2_{2\infty}}\right)\left(1-\frac{f_2^2}{f^2_{2\infty}}\right)}$$

$$m_1=\frac{\frac{f_1 f_2}{f^2_{2\infty}}g+h}{1-\frac{f^2_{1\infty}}{f^2_{2\infty}}}, \quad m_2=\frac{g+\frac{f^2_{1\infty}}{f_1 f_2}h}{1-\frac{f^2_{1\infty}}{f^2_{2\infty}}},$$

$$a=\frac{(1-m_1^2)f^2_{2\infty}}{4g f_1 f_2}\left(1-\frac{f^2_{1\infty}}{f^2_{2\infty}}\right)=\frac{(1-m_2^2)f_1 f_2}{4g f^2_{1\infty}}\left(1-\frac{f^2_{1\infty}}{f^2_{2\infty}}\right),$$

$$b=\frac{(1-m_2^2)}{4g}\left(1-\frac{f^2_{1\infty}}{f^2_{2\infty}}\right),$$

$$c=\frac{(1-m_1^2)}{4h}\left(1-\frac{f^2_{1\infty}}{f^2_{2\infty}}\right),$$

$$d=\frac{(1-m_1^2)f^2_{2\infty}}{4h f_1 f_2}\left(1-\frac{f^2_{1\infty}}{f^2_{2\infty}}\right)=\frac{(1-m_2^2)f_1 f_2}{4h f^2_{1\infty}}\left(1-\frac{f^2_{1\infty}}{f^2_{2\infty}}\right)$$

If $m_1=m_2=m$, we have the M-type, and $$f_{1\infty}f_{2\infty}=f_1 f_2, \text{ and } g=h.$$

Various simpler forms of band pass wave-filters can be obtained by some sacrifice in flexibility of design as compared with Figs. 18, 19 and 20; some of these will now be indicated.

4ª. *Band pass wave-filters of three elements per section.*—In addition to the condition expressed by (30), let $$f_{1\infty}=0, \text{ and } f_{2\infty}=f_2. \quad (31)$$

Figure 21:
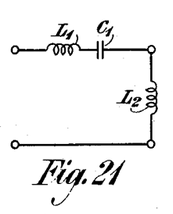
Figure 22:
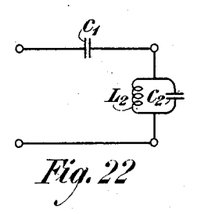
Figure 23:
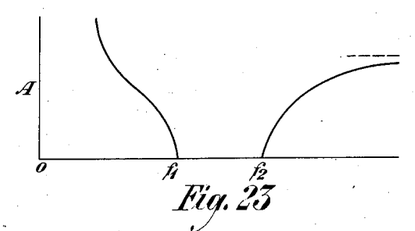

The corresponding structures are shown in Figs. 21 and 22 and the attenuation-frequency diagram in Fig. 23.

The formulæ for Fig. 21 are $$L_1=\frac{f_1 R}{\pi f_2(f_2-f_1)}, \quad L_2=\frac{(f_1+f_2)R}{4\pi f_1 f_2},$$

$$C_1=C_{1k}=\frac{f_2-f_1}{4\pi f_1 f_2 R}.$$

and for Fig. 22

$$C_1=\frac{f_1+f_2}{4\pi f_1 f_2 R}, \quad L_2=L_{2k}=\frac{(f_2-f_1)R}{4\pi f_1 f_2},$$

$$C_2=\frac{f_1}{\pi f_2(f_2-f_1)R}.$$

Alternatively to the foregoing, in addition to the condition of (30), let $$f_{1\infty}=f_1, \text{ and } f_{2\infty}=\infty. \quad (32)$$

Figure 24:
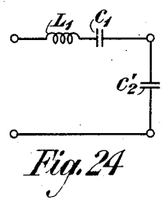
Figure 25:
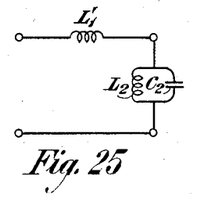
Figure 26:
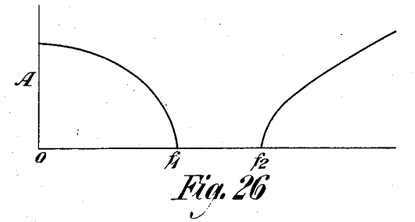

The corresponding structures and attenuation diagram are shown in Figs. 24, 25 and 26 respectively.

The formulæ for Fig. 24 are $$L_1=L_{1k}=\frac{R}{\pi(f_2-f_1)}, \quad C_2'=\frac{1}{\pi(f_1+f_2)R},$$

$$C_1=\frac{f_2-f_1}{4\pi f_1^2 R}.$$

and for Fig. 25

$$L_1'=\frac{R}{\pi(f_1+f_2)}, \quad L_2=\frac{(f_2-f_1)R}{4\pi f_1^2},$$

$$C_2=C_{2k}=\frac{1}{\pi(f_2-f_1)R}.$$

4ᵇ. *Band pass wave-filters with four elements per section.*—In addition to the condition of (30), let $$f_{1\infty}=0, \text{ and } f_{2\infty}=\infty. \quad (33)$$

Figure 27:
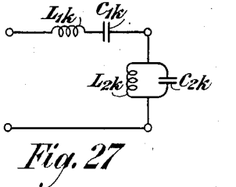
Figure 28:
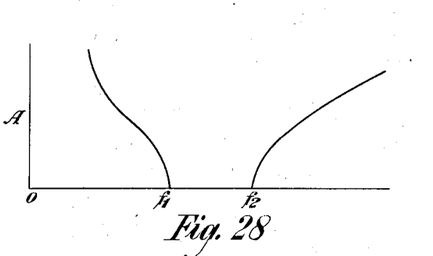

The corresponding structure will be of "constant $k$" type, where $k=R$ and there will be one example. The structure is shown in Fig. 27, and its attenuation-frequency characteristic is given in Fig. 28. The design formulæ are $$L_{1k}=\frac{R}{\pi(f_2-f_1)}, \quad L_{2k}=\frac{(f_2-f_1)R}{4\pi f_1 f_2}$$

$$C_{1k}=\frac{f_2-f_1}{4\pi f_1 f_2 R}, \quad C_{2k}=\frac{1}{\pi(f_2-f_1)R}. \quad (34)$$

Alternatively to the foregoing, in addition to the condition of (30), let $$f_{2\infty}=f_2. \quad (35)$$

Figure 29:
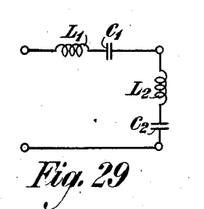
Figure 30:
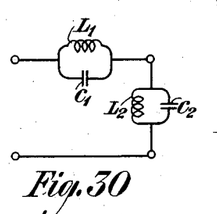
Figure 31:
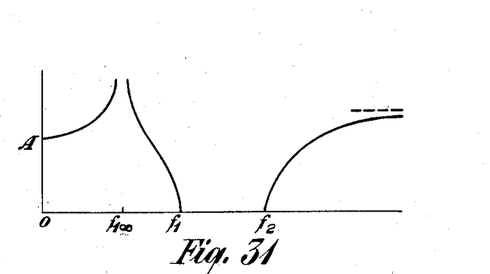

The corresponding structures are shown in Figures 29 and 30 and the corresponding attenuation-frequency characteristic in Fig. 31.

The formulæ for Fig. 29 are $$L_1=m_1 L_{1k}, \quad L_2=\frac{(1-m_1^2)}{4m_1}L_{1k}, \quad C_1=\frac{C_{1k}}{m_2}, \quad C_2=\frac{4m_2}{1-m_2^2}C_{1k}. \quad (36)$$

For Fig. 30

$$L_1=\frac{4m_2}{1-m_2^2}L_{1k}, \quad L_2=\frac{L_{2k}}{m_2}, \quad C_1=\frac{(1-m_1^2)}{4m_1}C_{2k}, \quad C_2=m_1 C_{2k}. \quad (37)$$

where $L_{1k}$, $C_{1k}$, $L_{2k}$ and $C_{2k}$ are given by (34) and where $$m_1 = \frac{f_1}{f_2} m_2, \quad m_2 = \sqrt{\frac{1 - \frac{f^2_{1\infty}}{f_1^2}}{1 - \frac{f^2_{1\infty}}{f_2^2}}}$$

As a further alternative, in addition to the condition of (30), let $$f_{1\infty} = f_1. \quad (38)$$

Figure 32:
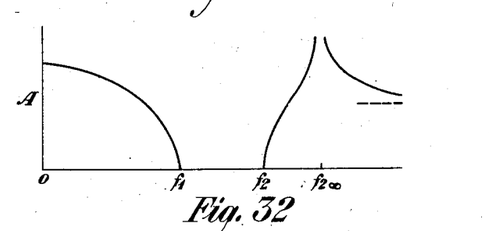

The corresponding structures will also be shown by Figs. 29 and 30, and the attenuation-frequency characteristic will be given by Fig. 32.

The formulæ for Figs. 29 and 30 are (36) and (37) respectively, where $L_{1k}$, $C_{1k}$, $L_{2k}$ and $C_{2k}$ are given by (34) and where $$m_1 = \sqrt{\frac{1 - \frac{f_2^2}{f^2_{2\infty}}}{1 - \frac{f_1^2}{f^2_{2\infty}}}}, \quad m_2 = \frac{f_1}{f_2} m_1.$$

4c. *Band pass wave-filters having five elements per section.*—In addition to the condition of (30), let $$f_{1\infty} = 0. \quad (39)$$

Figure 33:
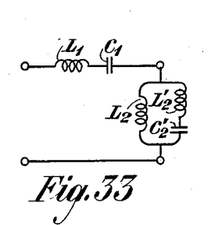
Figures 34, 35:
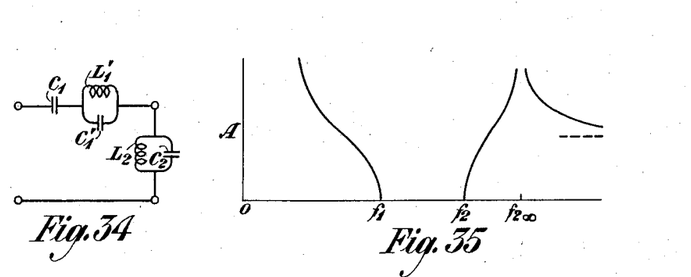

The corresponding structures are shown in Figs. 33 and 34 and the attenuation-frequency characteristic in Fig. 35.

The formulæ for Fig. 33 are $$L_1 = m_1 L_{1k}, \quad L_2 = a L_{1k},$$

$$C_1 = C_{1k}, \quad L'_2 = \frac{(1 - m_1^2)}{4h} L_{1k}, \quad C'_2 = \frac{h}{a} C_{1k}.$$

and Fig. 34 are $$C_1 = a C_{2k}, \quad L_2 = L_{2k},$$

$$L'_1 = \frac{h}{a} L_{2k}, \quad C_2 = m_1 C_{2k},$$

$$C'_1 = \frac{(1 - m_1^2)}{4h} C_{2k}.$$

where $$h = \sqrt{\left(1 - \frac{f_1^2}{f^2_{2\infty}}\right)\left(1 - \frac{f_2^2}{f^2_{2\infty}}\right)}, \quad m_1 = \frac{f_1 f_2}{f^2_{2\infty}} + h$$

$$a = \frac{(1 - m_1^2) f^2_{2\infty}}{4 f_1 f_2}$$

and where $L_{1k}$, $C_{1k}$, $L_{2k}$ and $C_{2k}$ are given by (34).

Alternatively to the foregoing, in addition to the condition of (30), let $$f_{2\infty} = \infty. \quad (40)$$

Figure 36:
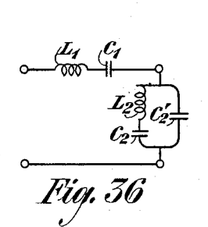
Figure 38:
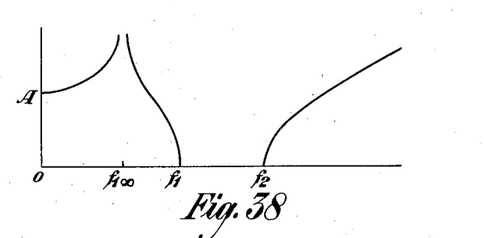

The corresponding structures are shown in Figs. 36 and 37 and the attenuation-frequency characteristic in Fig. 38.

The formulæ for Fig. 36 are $$L_1 = L_{1k}, \quad L_2 = \frac{d}{g} L_{1k},$$

$$C_1 = \frac{C_{1k}}{m_2}, \quad C_2 = \frac{4g}{1 - m_2^2} C_{1k},$$

$$C'_2 = \frac{C_{1k}}{d}.$$

and for Fig. 37

$$L_1 = \frac{4g}{1 - m_2^2} L_{2k}, \quad L_2 = \frac{L_{2k}}{m_2},$$

$$C_1 = \frac{d}{g} C_{2k}, \quad C_2 = C_{2k},$$

$$L'_1 = \frac{L_{2k}}{d}.$$

where $$g = \sqrt{\left(1 - \frac{f^2_{1\infty}}{f_1^2}\right)\left(1 - \frac{f^2_{1\infty}}{f_2^2}\right)}, \quad m_2 = g + \frac{f^2_{1\infty}}{f_1 f_2},$$

$$d = \frac{(1 - m_2^2) f_1 f_2}{4 f^2_{1\infty}}.$$

and where $L_{1k}$, $C_{1k}$, $L_{2k}$ and $C_{2k}$ are given by (34).

Figure 39:
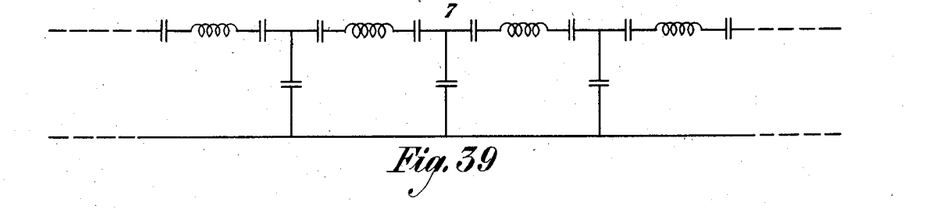
Figs. 39 to 42 are diagrams illustrating equivalent wave-filter structures obtained by means of the delta-star or star-delta substitution.
Figure 40:
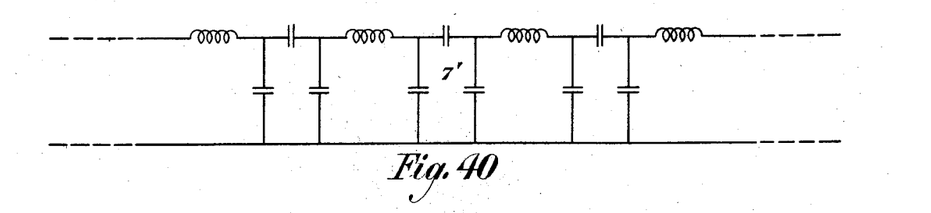
Figure 41:
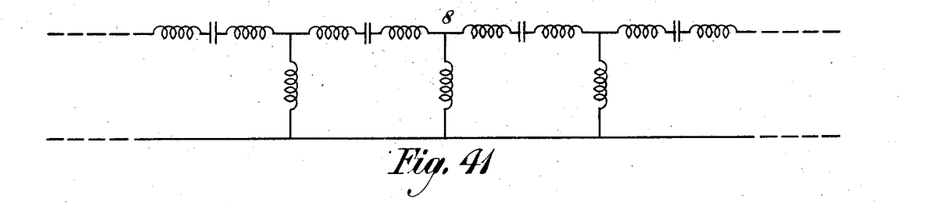
Figure 42:
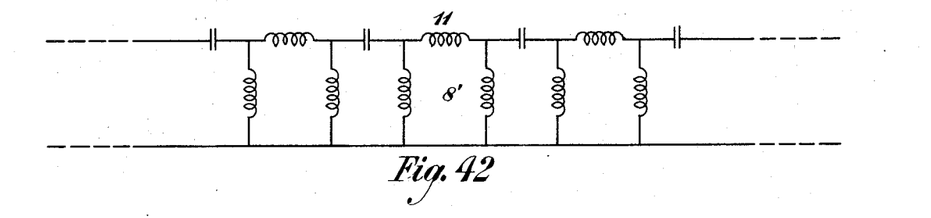
Figure 43:
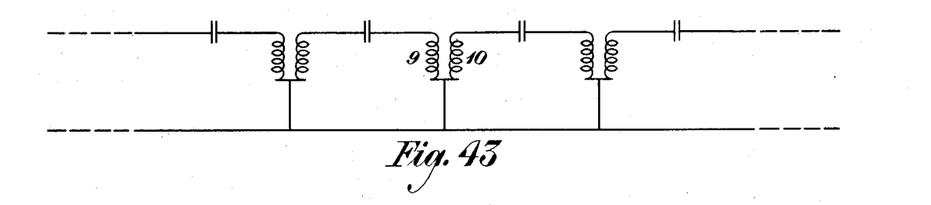
Fig. 43 shows a transformer substitution as compared with Figs. 41 or 42.

In the wave filters of the present disclosure it will be evident that various equivalent substitutions of groups of elements may be made. For one example, the delta-star or star-delta transformation may be made. As a simple illustration, consider the wave-filter of Fig. 39 which has the impedance elements of Fig. 24, each series condenser of Fig. 24 being replaced by an equivalent pair of condensers in series. At each point such as 7 in Fig. 39, there are three star-connected capacities. In Fig. 40 these are replaced by the three delta-connected capacities forming the mesh 7'. Again the elements of Fig. 21 give the wave-filter of Fig. 41 with three star-connected inductances at 8. In Fig. 42 these are replaced by the three delta-connected inductances forming the mesh 8'. By an alternative step, winding the coils 9 and 10 on the same core as in Fig. 43, with proper self and mutual inductances, an equivalent for Figs. 41 or 42 is obtained.

Figure 44:
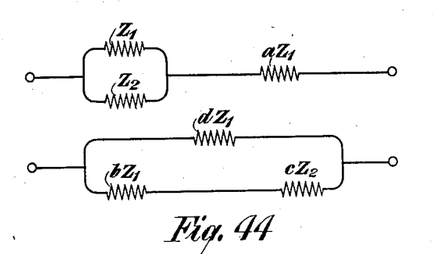
Figs. 44 to 49 are diagrams of pairs of equivalent networks.

Other substitutions than star-delta and delta-star may be made, and sometimes they will be very convenient, in accordance with Figs. 44 to 49. The two networks of Fig. 44 are equivalent when $$b = a(1+a), \quad c = (1+a)^2, \quad d = 1+a. \quad (41)$$

Figure 45:
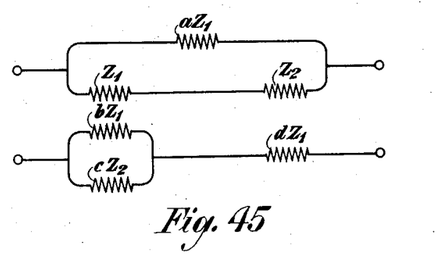

The two networks of Fig. 45 are equivalent when $$b = \frac{a^2}{1+a}, \quad c = \left(\frac{a}{1+a}\right)^2 \text{ and } d = \frac{a}{1+a}.$$

Figure 46:
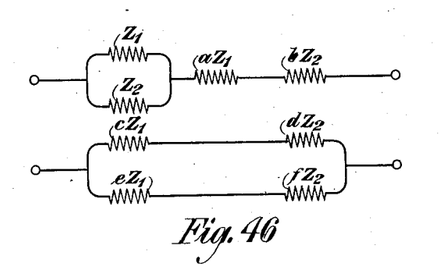

The two networks of Fig. 46 are equivalent when $$c = \frac{N(M+N)}{M+N-2b}, \quad d = \frac{2bN}{M+N-2b},$$

$$e = \frac{N(M-N)}{N-M+2b}, \quad f = \frac{2bN}{N-M+2b},$$

$$M = 1+a+b, \quad N = \sqrt{(1+a+b)^2 - 4ab}.$$

Figure 47:
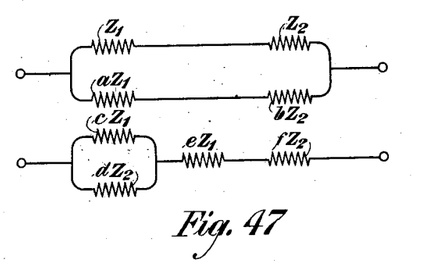

The two networks of Fig. 47 are equivalent when $$c = \frac{(a-b)^2}{(1+a)(1+b)^2}, \quad d = \frac{(a-b)^2}{(1+a)^2(1+b)},$$

$$e = \frac{a}{1+a}, \quad f = \frac{b}{1+b}$$

$$c = 1+a, \quad d = 1+b, \quad e = \frac{a(1+a)(1+b)^2}{(a-b)^2}, \quad f = \frac{b(1+a)^2(1+b)}{(a-b)^2}.$$

These six cases of equivalence of networks are readily proved by actually working out the impedance values in each case. For example, in Fig. 44 the impedance of the upper network is given by the expression $$\frac{z_1 z_2}{z_1 + z_2} + a z_1$$

and the impedance of the lower network is given by the expression:

$$\frac{dz_1(bz_1 + cz_2)}{dz_1 + bz_1 + cz_2}.$$

Substituting for $b$, $c$ and $d$ in terms of $a$ in accordance with (41) this impedance expression for the lower network of Fig. 44 will reduce to an identity with the impedance expression for the upper network, thus proving the equivalence of the two networks at all frequencies. In a similar manner the equivalence in each of Figs. 45 to 49 may be established.

I claim:

1. A low-and-band pass wave-filter having mid section equivalence with a "constant $k$" wave-filter and comprising means to produce infinite attenuation at two different frequencies between the pass ranges of frequency and means to produce infinite attenuation at one frequency above the band pass range of frequency.

Figure 48:
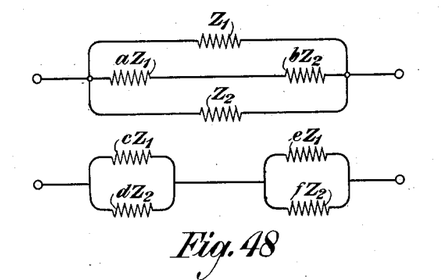

2. A low-and-band pass wave-filter of ladder type having mid section equivalence with a given prototype wave-filter and comprising means to produce infinite attenuation at two different frequencies between the pass ranges of frequency and means to produce infinite attenuation at one frequency above the band pass range of frequency, said prototype wave-filter having series and shunt reactance combinations, each series combination consisting of $L_{1k}$ in series with the parallel combination of $rL_{1k}$ and $C_{1k}$ and each shunt combination consisting of $C_{2k}$ in parallel with $L_{2k}$ and $rC_{2k}$, the last two elements in series, where the L's and the C's The two networks of Fig. 48 are equivalent when $$c = \frac{(2b-M+N)(M+N)}{4bN}, \quad d = \frac{2b-M+N}{2N},$$

$$e = \frac{(M+N-2b)(M-N)}{4bN}, \quad f = \frac{M+N-2b}{2N},$$

$$M = 1+a+b, \quad N = \sqrt{(1+a+b)^2 - 4ab}.$$

Figure 49:
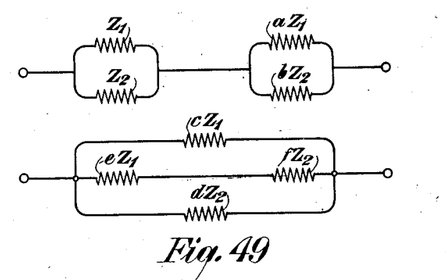

The two networks of Fig. 49 are equivalent when are respectively inductances and capacities and $r$ is a positive real number and the L's and C's are subject to the equation $$\frac{L_{2k}}{C_{1k}} = \frac{L_{1k}}{C_{2k}} = R^2$$

R being a positive real number.

3. A sectional ladder type low-and-band pass wave-filter comprising at least nine adjustable reactances per complete section whereby its three critical frequencies and two frequencies of infinite attenuation may be put at any consistent values desired.

4. A sectional ladder type low-and-band pass wave-filter comprising at least nine adjustable reactances per complete section whereby it may be adjusted alternatively to serve as a low pass-filter or a high pass-filter, or a low-and-high pass filter or a band pass filter.

5. A low-and-band pass wave-filter with nine reactance elements per section and with means to cut out certain of these elements whereby the wave-filter will become a low pass, high pass, low-and-high pass or band pass wave-filter according to which elements are cut out.

6. A low-and-band pass wave-filter with a plurality of reactance elements per section and with means to cut out certain of these elements whereby the wave-filter will become a low pass, high pass, low-and-high pass, or band pass wave-filter according to which elements are cut out.

7. A band pass wave-filter comprising series and shunt reactances and comprising means to produce infinite attenuation at two different frequencies, one in each attenuating range on respective sides of the pass band.

8. A band pass wave-filter comprising means to produce infinite attenuation at each of two critical frequencies, one in each attenuating range on respective sides of the pass band and having its reactance elements adjustable whereby its two cut-off frequencies and its two frequencies of infinite attenuation may be given any desirable consistent values.

9. A low-and-band pass wave-filter of ladder type having three like inductance-capacity combinations in each section, these three combinations each being related alike to the rest of the section, whereby the filter may be adjusted to give infinite attenuation at several desired frequencies in its attenuation ranges without disturbance of its cut-off frequencies or its impedance-frequency characteristic.

In testimony whereof, I have signed my name to this specification this 3rd day of May, 1923.

OTTO J. ZOBEL.